(12) United States Patent
Boyd et al.

(10) Patent No.: US 7,719,544 B2
(45) Date of Patent: *May 18, 2010

(54) SYSTEMS AND METHODS FOR PROVIDING CONTROLLABLE TEXTURE SAMPLING

(75) Inventors: Charles N. Boyd, Woodinville, WA (US); Michael A. Toelle, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/938,113

(22) Filed: Nov. 9, 2007

(65) Prior Publication Data

US 2008/0122856 A1 May 29, 2008

Related U.S. Application Data

(63) Continuation of application No. 10/176,811, filed on Jun. 20, 2002, now Pat. No. 7,324,116.

(51) Int. Cl.
  *G09G 5/00* (2006.01)
(52) U.S. Cl. ............... 345/582; 345/420; 345/423; 345/424; 345/426; 345/586; 345/606; 382/260
(58) Field of Classification Search .............. None
  See application file for complete search history.

(56) References Cited

U.S. PATENT DOCUMENTS

| 5,550,960 | A | 8/1996 | Shirman et al. |
|---|---|---|---|
| 5,651,104 | A | 7/1997 | Cosman |
| 5,877,771 | A | 3/1999 | Drevin et al. |
| 5,990,903 | A | 11/1999 | Donovan |
| 6,037,949 | A | 3/2000 | DeRose et al. |
| 6,088,036 | A | 7/2000 | Morris |
| 6,204,856 | B1 | 3/2001 | Wood et al. |
| 6,292,193 | B1 | 9/2001 | Perry et al. |
| 6,300,960 | B1 | 10/2001 | DeRose et al. |
| 6,426,755 | B1 | 7/2002 | Deering |
| 6,509,902 | B1 | 1/2003 | Pfister et al. |

(Continued)

FOREIGN PATENT DOCUMENTS

GB          2245805          1/1992

(Continued)

OTHER PUBLICATIONS

Blinn, J.F. and Newell, M.E., "Texture and Reflection in Computer Generated Images," Communications of the ACM, Oct. 1976, vol. 19, No. 10, pp. 542-547.

(Continued)

*Primary Examiner*—Antonio A Caschera
(74) *Attorney, Agent, or Firm*—Woodcock Washburn LLP

(57) ABSTRACT

Systems and methods are provided for controlling texture sampling in connection with computer graphics in a computer system. In various embodiments, improved mechanisms for controlling texture sampling are provided that enable 3-D accelerator hardware to greatly increase the level of realism in rendering, including improved mechanisms for (1) motion blur; (2) generating anisotropic surface reflections (3) generating surface self-shadowing (4) ray-cast volumetric sampling (4) self-shadowed volumetric rendering and (5) self-shadowed volumetric ray-casting. In supplementing existing texture sampling techniques, parameters for texture sampling may be replaced and/or modified.

60 Claims, 10 Drawing Sheets

U.S. PATENT DOCUMENTS

| | | | |
|---|---|---|---|
| 6,580,425 | B1 | 6/2003 | Zwicker et al. |
| 6,600,487 | B1 | 7/2003 | Henn et al. |
| 6,664,962 | B1 | 12/2003 | Komsthoeft et al. |
| 6,664,971 | B1 | 12/2003 | Mukherjee et al. |
| 7,133,041 | B2 | 11/2006 | Kaufman et al. |
| 7,324,116 | B2 * | 1/2008 | Boyd et al. ................. 345/582 |

FOREIGN PATENT DOCUMENTS

| | | |
|---|---|---|
| JP | 63213079 | 9/1998 |
| JP | 11250279 | 9/1999 |
| JP | 2000155845 | 6/2000 |
| JP | 2001501349 | 1/2001 |
| JP | 2001236523 | 8/2001 |
| JP | 2002032779 | 1/2002 |
| WO | WO 00/04505 | 1/2000 |
| WO | WO 01/20553 A1 | 3/2001 |

OTHER PUBLICATIONS

Heckbert, P.S., "Survey of Texture Mapping," IEEE Computer Graphics and Applications, Nov. 1986, pp. 56-67.

Olano, Jukherjee, Dorbie, "Vertex-based Anisotropic Texturing," SGI ACM, 2001, pp. 95-98.

Westover, Lee "Footprint Evaluation for Volume Rendering," Computer Graphics, vol. 24, No. 4, Aug. 1990, pp. 367-376.

Sloan, Peter-Pike, Cohen, Michael. "Interactive Horizon Mapping," Microsoft Research, Date Unknown.

McCool, M, Heidrich, W. "Texture Shaders" 1999 Eurographics Los Angeles ACM, 1999, pp. 117-126.

McCool, M "Shadow Volume Resconstruction from Depth Maps" ACM Transactions on Graphics, vol. 19, No. 1, Jan. 2000, pp. 1-26.

Fuchs, H. "Fast Spheres, Shadows, Textures, Tranparencies, and Image Enhancements in Pixel Planes" Siggraph '85 ACM, vol. 19, No. 3, 1985, 111-120.

Wang, Y., Molnar, S., "Second-Depth Shadow Mapping" Department of Computer Science, UNC, Date Unknown http://www.cs.unc.edu/.about.lastra/Courses/Papers/Wang.sub.—Molnar.sub.—Second.sub.—Depth.sub.—Shadow.pdf.

Soler, C., Sillion, F., "Fast Calculation of Soft Shadow Textures Using Convolution" ACM, Date Unknown.

"Vertex-based anisotropic texturing" Marc Olano, Shrijeet Mukherjee, Angus Dorbie. Proceedings of the ACM Siggraph/Eurographics workshop on Graphics hardware. Published 2001. ACM Press New York, NY, USA. pp. 95-98.

Azariadis, P.N. et al., "On Using Planar Developments to Perform Texture Mapping on Arbitrarily Curved Surfaces," Comp. & Graphics, 2000, 24(4), 539-554.

Chen, J.X. et al., "Real-time Simulation of Dust Behavior Generated by a Fast Traveling Vehicle," ACM Trans. on Modeling and Computer Simulation, 1999, 9(2), 81-104.

Claes, J. et al., "Locally interpolating Subdivision Surfaces Supporting Free-Form 2D Deformations," Deformable Avatars. IFIP TC5/WG5.10 Deform'2000 Workshop, Nov. 29-Dec. 1, 2000, 59-71 (English abstract only).

Hirota, K. et al., "Development of Surface Display," Proceedings of IEEE Virtual Reality Annual International Symposium, Sep. 18-22, 1993, 256-262.

Khouas, L. et al., "A 2D Texture Model Based on an Autoregressive Approach for 3D Furlike Texture Synthesis," Image and Multidimensional Digital Signal Processing '98 Proceedings, Jul. 12-16, 1998, 275-278.

Papaioannou, G. et al., "A Texture Controller," Visual Computer, 1998, 14(10), 488-496.

Samek, M. et al., "Texture Mapping and Distortion in Digital Graphics," Visual Computer, 1986, 2(5), 313-320.

Yagi, N. et al., "A Programmable Video Signal Multi-Processor for HDTV Signals," Proceedings—1993 IEEE International Symposium on Circuits and Systems, May 3-6, 1993, 3, 1754-1757.

Chen, B. et al., "Forwarding Imaging Mapping," Visualization, 1999, 89-90, 514, XP 010364950.

\* cited by examiner

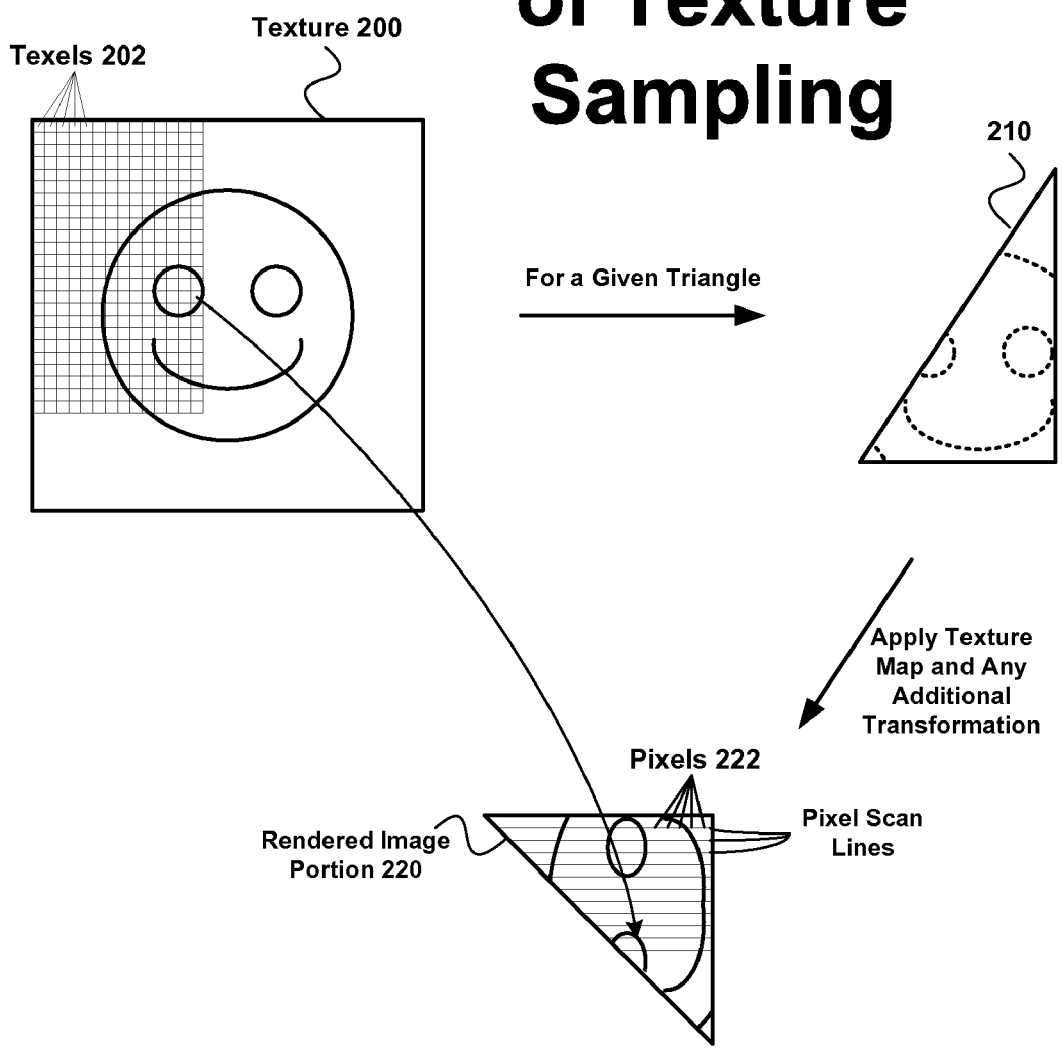
FIG. 1 - Prior Art

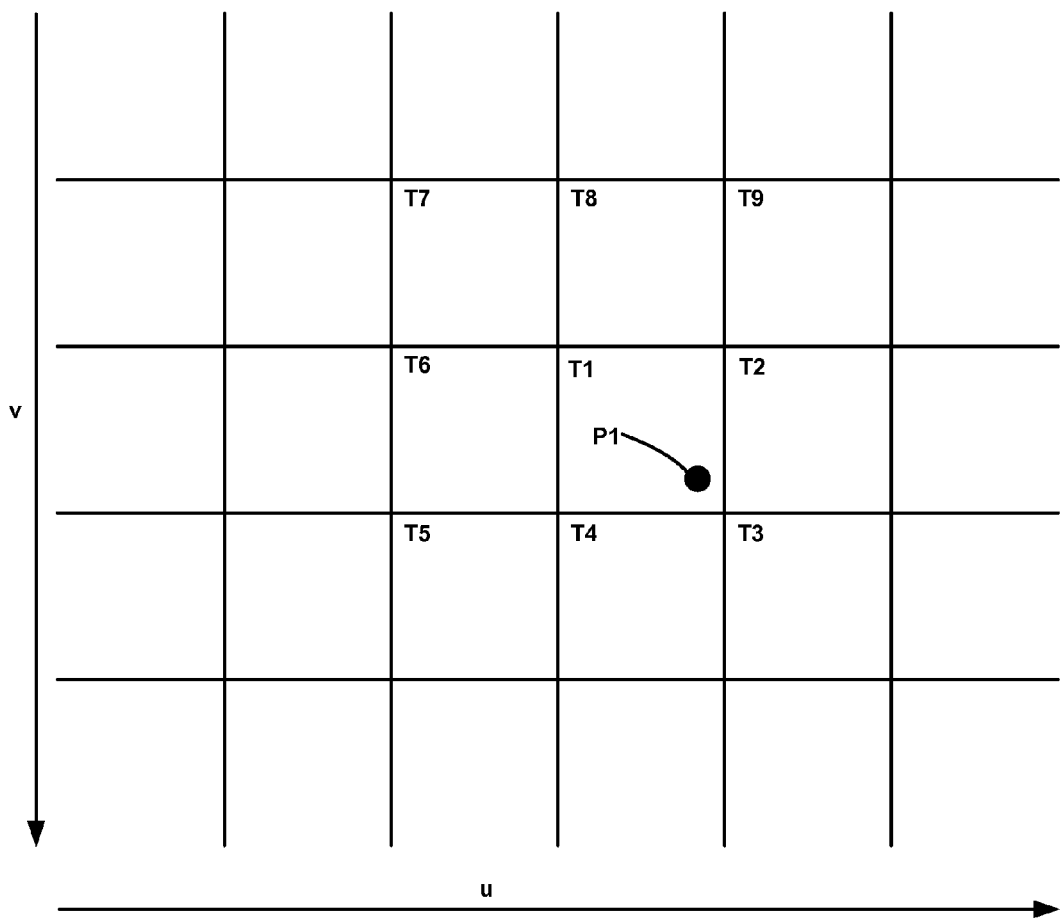
**FIG. 2A - Prior Art
Point Sampling**

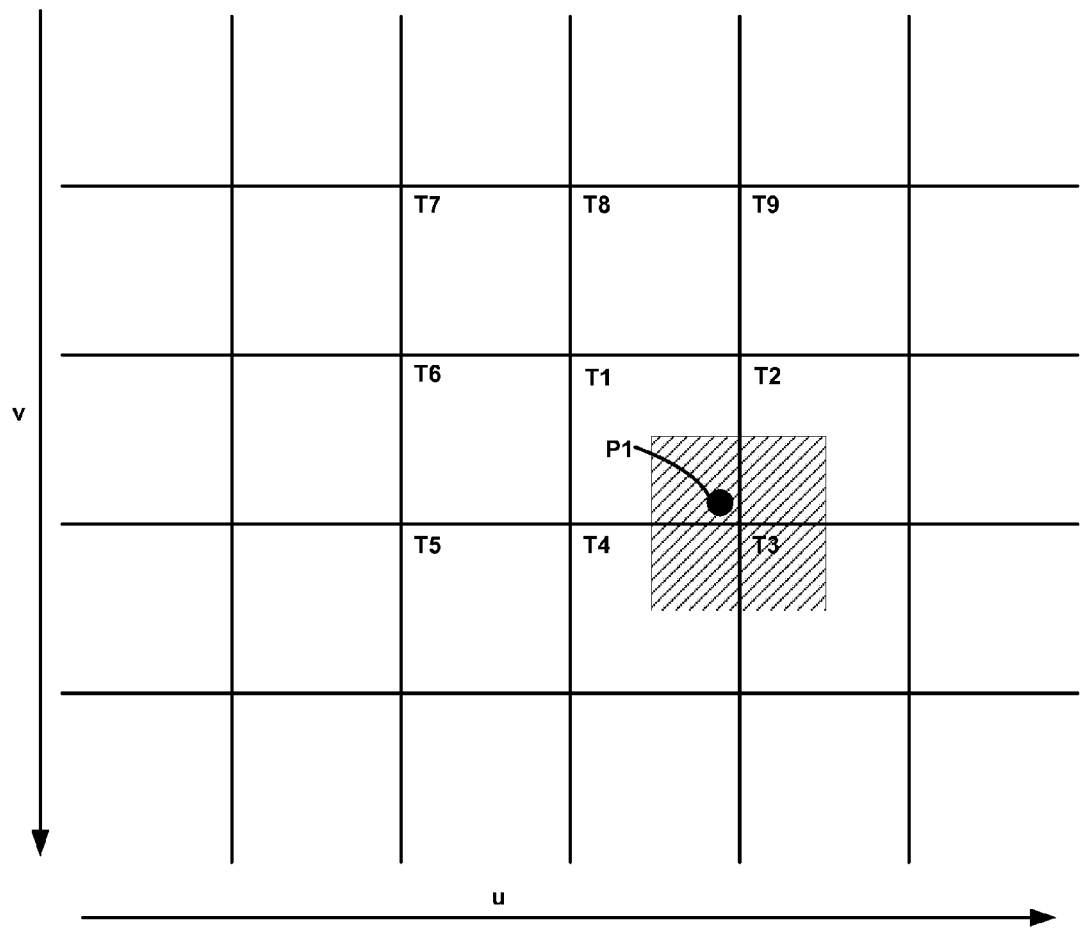
**FIG. 2B - Prior Art
Bilinear Filtering**

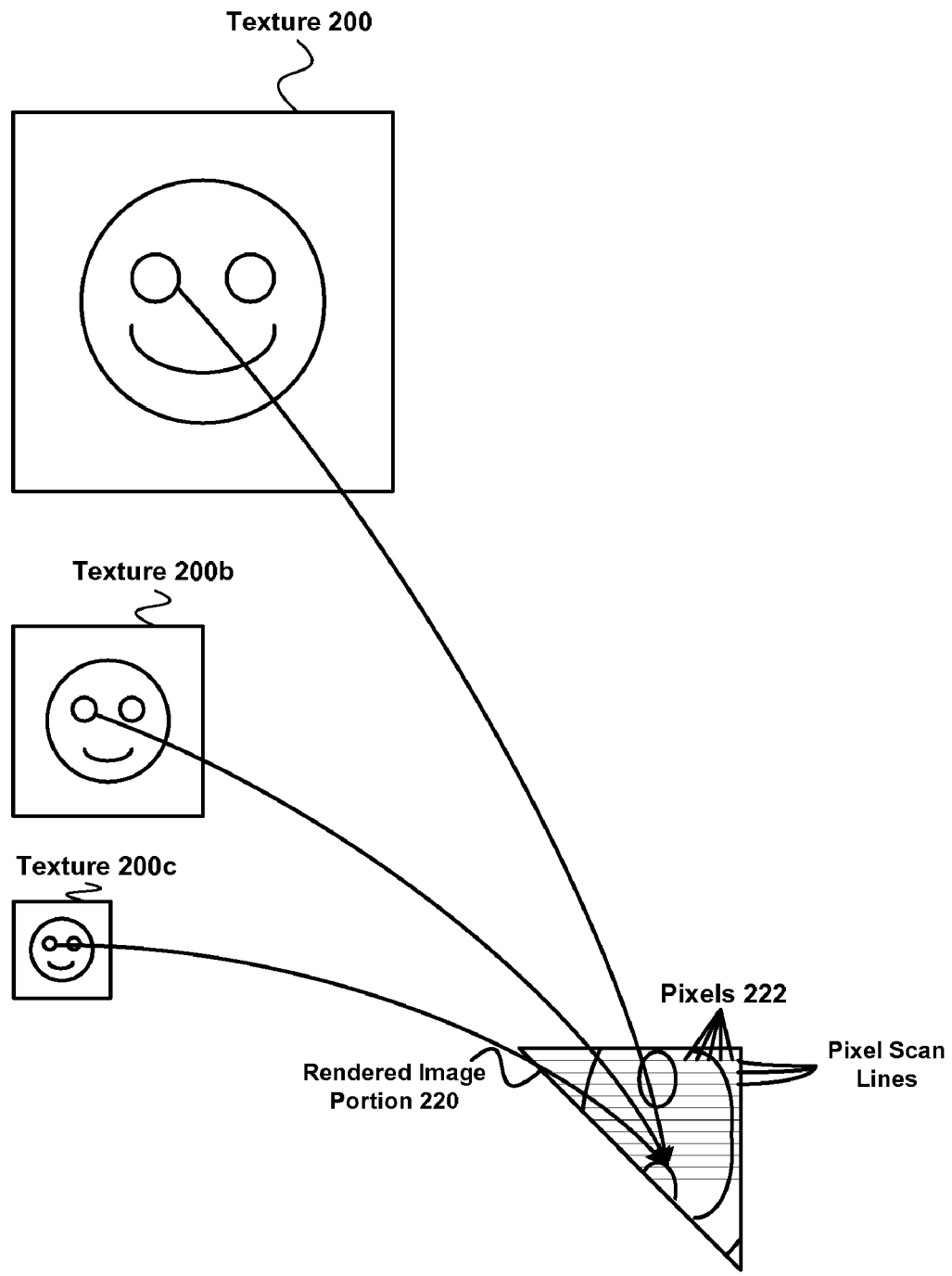
FIG. 2C - Prior Art MIP-mapping

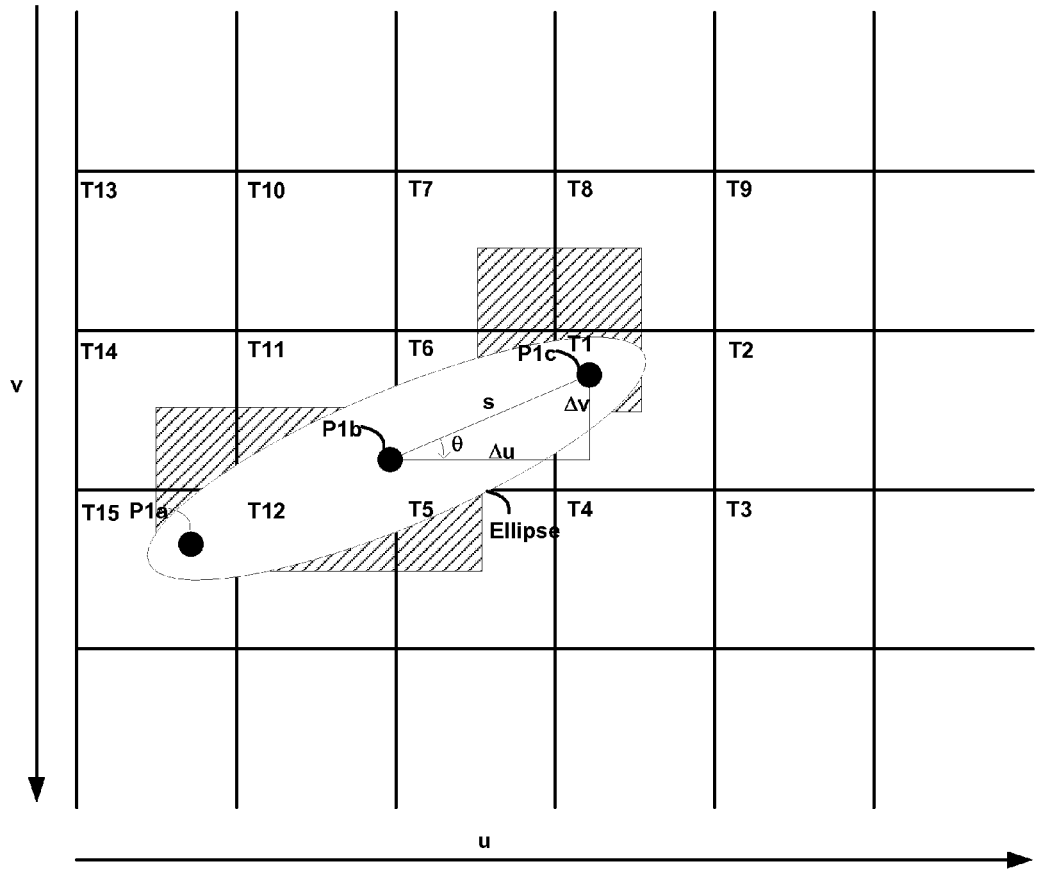
**FIG. 2D - Prior Art
Anisotropic Filtering**

SYSTEMS AND METHODS FOR PROVIDING CONTROLLABLE TEXTURE SAMPLING

CROSS REFERENCE TO RELATED APPLICATIONS

This application is a continuation of application Ser. No. 10/176,811 filed Jun. 20, 2002 now U.S. Pat. No. 7,324,116, the entirety of which is incorporated herein by reference.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2001, Microsoft Corp.

FIELD OF THE INVENTION

The present invention is directed to systems and methods for providing texture sampling in connection with computer graphics. More particularly, the present invention is directed to systems and methods for providing controllable texture sampling.

BACKGROUND OF THE INVENTION

Texture mapping allows a colored, or textured, signal be imaged onto geometry, giving the appearance of detail on coarse triangle meshes. Using textures is generally more efficient than refining the carrier geometry to represent the signal per vertex. While rasterization hardware has supported basic texture mapping for many years, it has recently begun to offer more powerful features.

An overview of the texture mapping process is shown in FIG. 1. Given texture map 200, having texels 202, texture mapping applies the signal of the texture map 200 to triangles 210 of a mesh according to some geometric configuration of the triangle, and/or applies some additional transformation, such as shadowing, lighting, etc. which maps texels 202 to pixels 222.

Texture mapping is a problem that implicates the Nyquist theory, to the extent aliasing is to be avoided, which states that to accurately reproduce an analog waveform, the analog signal should be sampled at a rate at least twice its highest frequency to be able to represent the signal in the digital domain with a high level of accuracy. Digital-to-analog conversion techniques are then utilized to reconstruct the original analog signal accurately. If an insufficient sampling rate is used, the result is aliasing, which is incorrectly sampled high-frequency information that appears as lower frequency noise.

Sampling issues arise in connection with texture mapping as well. The process of texture mapping samples texture maps to screen pixels, and to the extent possible, the texture map data should have been sampled at a sufficiently high sampling rate to encompass the highest of frequency information. In this regard, typically, screen objects represented by a certain number of picture elements (pixels) use texture maps with a different number of texture elements (texels). When texture maps have more texels than the pixel space, a single pixel may map to more than one texel and when texture maps have fewer texels than the pixel space, multiple pixels may map to a single texel. When there is no exact mapping between texture space and picture space, display quality issues can arise.

In effect, the texture map may either not be able to effectively map proper image detail to the designated pixel area, or conversely, a smaller pixel area may not be able to use all the texture detail from a larger/richer texture map.

Specifically, in the case where a texture map is too small compared to the pixel area being mapped, then the same texel is mapped to adjacent pixels, which causes a blockiness effect when viewing the image. In the other case, if multiple texels map to the same pixel, it is often up for grabs which exact texel, from the group of texels that could map to a given pixel, will be selected from the texture map and applied to the pixel. It is thus an algorithm-dependent process and can result in artifacts known as texture swimming and pixel-popping, both of which are very noticeable when the camera moves. Moreover, even if a substantially similar or same number of pixels and texels exist for mapping therebetween, there may be some transformation, or function, applied to the texels prior to rendering, in which case some algorithm must still decide where the pixel data should come from with respect to the texel data.

For purposes of illustrating problem(s) that may arise, the case with a number of texels greater than the number of pixels may be considered as follows. Assume there a square billboard surface in a three-dimensional (3-D) scene comprising two equilateral triangles, wherein the square is 100×100 pixels. If one applied a texture map comprising 200 horizontal red and blue stripes on top of the 100×100 pixel square area, all 200 stripes of the texture could not be discerned once applied to the billboard because the texture has more samples than the pixel area to which it will be applied. Some of the intermediate texture data will not be used in the mapping, and will essentially be ignored.

As one's 3-D viewpoint is moved over the billboard, if navigating in a game, for example, a phenomena called pixel popping arises, which is a result of the texture's stripes coming in and out of alignment with the billboard pixels. This is a case of an insufficient texture-sampling rate to describe the scene's details. This is an illustration of one type of artifact that can results, as other types of artifacts can result from a poor texture sampling as well.

There are several approaches to minimize the rendering artifacts caused by an insufficient texture-sampling rate, mostly in the form of filtering and re-sampling. The two filter methods used in the simple texturing methods like point-sampling are Magnification and Minification, which alter the texture sampling methods to help avoid the problems depicted above.

The minification algorithm is used in the case where multiple texels can map to a single pixel, and it selects the best fit texel from among the group texels that could map to the pixel. The magnification technique is used when multiple pixels can map to a single texel, and it maps a single texel to multiple pixel. There are many methods varying in speed and quality for applying textures, including point sampling, bilinear filtering, trilinear MIP-mapping, anisotropic filtering and anti-aliasing.

The most basic way to apply textures to a surface is point sampling, which uses a "nearest neighbor" sampling method. When the renderer fetches a piece of texture, it grabs the texture sample from the texture map that has (u, v) coordinates that map nearest to the pixel's coordinates (the pixel center), and applies it to the pixel. This approach is illustrated in FIG. 2A, wherein the relevant position of the mapping from pixel space to texel space is located at position P1. Here, since the closest texel is T1, T1 is selected. Though this approach requires the least amount of memory bandwidth in terms of the number of texels that need to be read from texture memory, i.e., one per pixel, the result often causes artifacts as discussed above, owing to insufficient samples, i.e., screen pixels, to describe the texture. But even first-generation personal computer (PC) 3-D hardware had a feature to help clean up, or at least hide these sampling problems to a certain extent, namely, by utilizing bilinear filtering.

Rather than just grab the nearest neighbor on a texture, bilinear filtering instead reads the four samples nearest to the pixel center, and uses a weighted average of those color values as the final texture color value. Thus, as illustrated in FIG. 2B, a weighted average of T1, T2, T3 and T4 is taken, wherein the weights are based on the distance from the pixel center to the four texel centers. Exemplary equations for bilinear filtering known to those of ordinary skill in the graphics processing art are as follows:

$$c_a = p_{i,j} \cdot \alpha + (p_{i,j+1}) \cdot (1-\alpha_a)$$

$$c_b = p_{i+1,j} \cdot \alpha + (p_{i+1,j+1}) \cdot (1-\alpha_a)$$

$$F = \mathrm{lrp}(c_a, c_b) \cdot \alpha_b,$$

where lrp is a linear interpolation function readily understood by today's graphics processing units (GPUs). The visual net effect is to blur out a good deal of the texture artifacts seen with point sampling, but because it is only a four-tap filter working with a single texture map, the effectiveness of bilinear filtering is limited.

Another approach to improving texture image quality is a technique known as MIP-mapping, where the renderer makes multiple copies of the original texture, and each successive MIP-map is exactly half the resolution of the previous one. This effectively becomes a kind of 3-D texture, wherein the standard two coordinates, (u, v) are present, but there is also a third coordinate, d, used to measure which MIP-map(s) to select based on which map resolution will most closely match the pixel area to be mapped. In the case where a fighter plane is close to the view camera, a very detailed texture map would be selected, but as the plane flies off into the distance, successively smaller and less detailed maps would be used.

As the d coordinate increases, smaller and smaller MIP-maps are used. The derivation of the d coordinate tends to be complicated and implementation dependent, but in general relates to figuring out how much texture magnification or minification would result from a particular MIP-map selection based on the pixel area to be covered. The MIP-map with the smallest amount of texture magnification and minification is thus selected by this method. As illustrated by FIG. 2C, the problem of MIP-mapping is thus one of selecting which texture 200a, 200b, 200c, etc. to utilize to represent the number of pixels in pixel rendition 220 best.

There are a few different ways applications can use MIP-maps, and they are often dependent on graphics hardware support. In some cases, an application may opt (A) to select a single map that corresponds best to the pixel area to be mapped, (B) to apply bilinear filtering to texels in that map, and then (C) to apply the resulting averaged texels to their corresponding pixels. However, visual problems with bilinear MIP-mapping may occur at map boundaries when moving through the scene. For example, when driving down a roadway in a game, one can see visible breaks in roadway texture. This is likely due to a MIP-map switch.

A higher quality method of MIP-mapping often used is called trilinear MIP-mapping, which helps alleviate the MIP-map boundary problem discussed above. This filtering method takes two bilinear samples, using four texel samples each, from the two MIP-maps nearest to the pixel, where one texture map might be a bit larger in resolution and the other a bit smaller in resolution than the pixel area to be mapped. The trilinear algorithm then uses a weighted average to combine the two bilinear-filtered texels into a resultant textured pixel, with the map whose resolution is closer to the pixel area receiving more weight.

Even trilinear MIP-mapping suffers some shortcomings, however, mostly relating to level of detail (LOD) biasing. Each MIP-map is said to have an associated LOD, and biasing has to do with the weighting factor of the average between the two bilinear filtered samples taken from the two different maps. If LOD biasing is turned "up" too much, weighting the average more toward the smaller resolution map, texture blur can result. If the LOD bias is turned "down" too much, weighting the average toward the larger MIP-map, aliasing, and temporal aliasing, such as texture shimmering/crawling can result. LOD biasing thus alters the d value, causing smaller or larger maps to be used, although the d value is still preconfigured at development time. The main problem with these techniques is the isotropic nature of bilinear or trilinear filtering. The magnification/minification along one axis in the texture may be significantly different the magnification/minification along the other axis, which can result in aliasing along one axis and blurring in the other.

There is another filtering technique called anisotropic filtering that attempts to address the isotropic nature of bilinear and trilinear filtering. One form of anisotropic filtering uses MIP-map sampling, but rather than taking eight samples, it instead takes up to 16. In using anisotropic filtering, one specifies for the renderer what the degree of anisotropy is, which is a ratio of how far a texture can be stretched before its image quality starts to degrade.

In another form of anisotropic filtering, bilinear filtering is performed multiple times along some angle. This can be useful where "streaking" is a natural by product of the pixel rendering, e.g., as is the case with the road flying by in a race car video game. When the textured polygon is at an oblique angle to the plane of the screen, the footprint corresponding to a screen pixel mapped onto the texture becomes elongated, i.e., no longer square. More sophisticated methods use the odd-shaped collection of texels in this footprint and blend them together to produce the final result. Computing the correct shape to use for this sampling footprint, and how long it should be, is a very difficult problem. Any currently known algorithms for doing this base their computations only on the relative geometry of the screen-pixel to polygon texels alignment, and none provide flexibility that enables a developer to predictably/intelligently control the process.

This form of anisotropic sampling which multiply performs bilinear filtering is illustrated in FIG. 2D, for a point P1a, which is to be anisotropically filtered along an angle θ, defined by the ratio Δv/Δu, and a stepsize s between points P1a, P1b, P1c, etc., defined by the magnitude of Δv and Δu, in accordance with some prefixed geometric aspect of the triangle being rendered. An elliptical shape along the angle θ defines the positioning of P1b and P1c. Then, bilinear filtering is performed for each of P1a, P1b and P1c, which for this example, in a weighted fashion, blends together the corresponding groups of four: (A) T14, T11, T15 and T12, (B) T11, T12, T6 and T5 and (C) T7, T6, T8 and T1, respectively.

In using more samples in the direction the texture would have to be stretched to fit the surface where it is being applied, anisotropic filtering achieves sharper image quality than bilinear or trilinear filtering, and also avoids the texture shimmering found with point sampling. It is also noted that anisotropic-filtered text that is displayed at an angle, as might be in a billboard in a racing game, or at the start of a Star Wars movie, renders more clearly than with other filtering methods.

Generally, graphics application programming interfaces (APIs) have provisions for a single vertex to store two or more texture addresses for use in multitexturing effects. Early on, multitexturing was used to create lighting effects using light maps, but it has since been applied to do additional effects like bump mapping. These multitexturing features eventually compelled 3-D chipmakers to invest chip real-estate into creating parallel pixel pipelines, and in more recent generations of chips, to process multiple texels per pixels per clock.

The advantage gained by having parallel pipes capable of handling multiple texels per pixel is that multitexturing operations can often be done in a single clock cycle, rather than having to perform multipass rendering, where each pixel in a scene is drawn several times. For each additional pass a chip has to make to render a scene, its effective pixel fill rate is divided by the number of passes that need to be made. So if a chip with 500 Mpixels/sec of fill rate had to do two passes in order to render a scene with multitexturing effects in it, that chip's effective fill rate is halved to 250 Mpixels/sec. If it makes four passes, the fill rate drops to 125 Mpixels/sec. Thus, parallel pipelines have greatly increased the efficiency of graphics rendering as well.

Multitexturing does not operate that much differently from regular single texturing, except that the separate textures have to be blended together, and then blended with the existing pixel color produced by shading. However, doubling or tripling the number of textures being used in a scene drastically increases the amount of frame buffer bandwidth required to fetch the additional textures, and if multiple passes are being done, there once was concern that overall performance would suffer. However, the evolution of extremely fast graphics processors in recent years has laid these concerns to rest.

Texturing, and multitexturing, can be used to create a wide array of visual effects, with basic surface description being only the tip of the iceberg. Developers have also discovered another way to create textures; rather than store a "canned" bitmap, a developer can instead create a small program that creates textures procedurally. This technique has been used to create anything from marble surfaces, to terrain textures in large outdoor environments, to moving water effects.

Another process many applications seek to do with 3-D is to set a mood. This is especially important to attempt to immerse gamers inside the world the developer has conjured up. One useful tool to achieve different moods is fog, which also helps give a scene an addition sense of depth of field.

Fog can be implemented in several different ways, with the variations having mostly to do with how the fog becomes foggier. Two very common methods are called linear and exponential fog, which scale linearly and exponentially, respectively, as their names suggest. Fog can also be applied per vertex or per pixel, and as in most things in 3-D, per pixel looks more convincing, but is computationally more expensive.

A more advanced method of applying fog is called range-based fog, which traditionally has not been available in consumer 3-D chips, but with the arrival of vertex shaders in DirectX8, range-based fog is an option. Another method is called fog table, where fog values are stored in a lookup table, then applied to each pixel.

But irrespective of technique, fog is a function of how far away an object is, which is usually determined by its z value, the distance from the view camera. A fog factor, whether computed linearly or exponentially, is then computed and applied to the pixel using a blending operation to combine the fog amount (color) and the lit/shaded/textured pixel color. If fog is being performed per vertex, fog operations become a part of the lighting calculation, and are interpolated across each triangle using Gouraud shading.

Another practical use for fog is to allow objects at the far clipping plane to gracefully "fade away" rather than just pop out of the scene. Fog can also be used to allow a renderer to only have to draw world objects relatively close to the view camera. So when the fog value gets near or reaches zero (fog values are typically floating-point values between zero and one, with zero being absolute fog and one being no fog), the object is essentially discarded, and no further rendering work needs to be done.

Techniques for applying transparency and translucency exist as well. Unlike opaque objects, transparent objects must generally be depth sorted in back-to-front order to ensure that the underlying colors that are blended with the transparent objects are available when the blending operation is performed. There are several formulae that get used to calculate an object's translucency, but a common formula is:

$$c_o = \alpha \cdot c_s + (1-\alpha) \cdot c_d, \text{ wherein}$$

$c_o$=final color of pixel
$\alpha$=alpha value (between 0 and 1)
$c_s$=color of the transparent pixel (called the source) and
$c_d$=color of the occluded pixel (called the destination).

This formula is a sum of two pixel modulations, where the alpha value is applied differently to both pixels, and the resultant values are added together to give the final pixel color.

Thus, there are a myriad of techniques that can be applied in connection with texture sampling computer graphics; however, thus far, the selection of any of the myriad of techniques is fixed by the developer at development time without much flexibility. Since certain variables and heuristics are useful for certain graphical circumstances, and not others, the end quality result can be a mixed bag, even with ever increasing processing power. Accordingly, it would be desirable to increase the amount of intelligence applied to texture sampling algorithms at the front end of the process. In view of an increasing trend towards flex-function GPU, it would be desirable to expose controllable texture sampling for developers to apply on the fly, dynamic intelligence to handle different circumstances in the most efficacious manner. As more advanced programmable per-pixel shading and lighting algorithms become available that take into account material properties, curved surfaces, volumetric textures, and that have far more complex single-pass texture blending, it becomes all the more desirable to enable developers to have control over the texture sampling process. It might also be desirable to controllably introduce artifacts into a rendered image, such as blurring, or streaking, or shimmering. Accordingly, it would be desirable to provide any one or more of an operating system, driver code, an application programming interface, a tool kit and/or functionality in the graphics pipeline itself, including the GPU or other coprocessing device, a mechanism which provides controllable texture sampling capabilities.

SUMMARY OF THE INVENTION

In view of the foregoing, the present invention provides systems and methods for providing controllable texture sampling in connection with computer graphics in a computer system. In various embodiments, improved mechanisms for controlling texture sampling are provided that enable 3-D accelerator hardware to greatly increase the level of realism in rendering, including improved mechanisms for (1) motion blur; (2) generating anisotropic surface reflections (3) generating surface self-shadowing (4) ray-cast volumetric sampling (4) self-shadowed volumetric rendering and (5) self-shadowed volumetric ray-casting. In supplementing existing texture sampling techniques, parameters for texture sampling may be replaced and/or modified.

In various embodiments, methods, apparatus, computer readable media and coprocessing devices are provided which enable controllable texture sampling including specifying parameter(s) of a sampling footprint utilized in connection with texture sampling of a texture map and texture sampling the texture map in accordance with the specified parameters of the sampling footprint.

Other features and embodiments of the present invention are described below.

BRIEF DESCRIPTION OF THE DRAWINGS

The system and methods for providing controllable texture sampling in accordance with the present invention are further described with reference to the accompanying drawings in which:

FIG. 1 provides an overview of the process of texture sampling in a computer graphics system;

FIG. 2A provides an overview of a prior art point sampling process utilized in connection with texture sampling in a computer graphics system;

FIG. 2B provides an overview of a prior art bilinear filtering process utilized in connection with texture sampling in a computer graphics system;

FIG. 2C provides an overview of a prior art MIP-mapping process utilized in connection with texture sampling in a computer graphics system;

FIG. 2D provides an overview of a prior art anisotropic filtering process utilized in connection with texture sampling in a computer graphics system;

DETAILED DESCRIPTION OF THE INVENTION

Overview

Figure 3A:
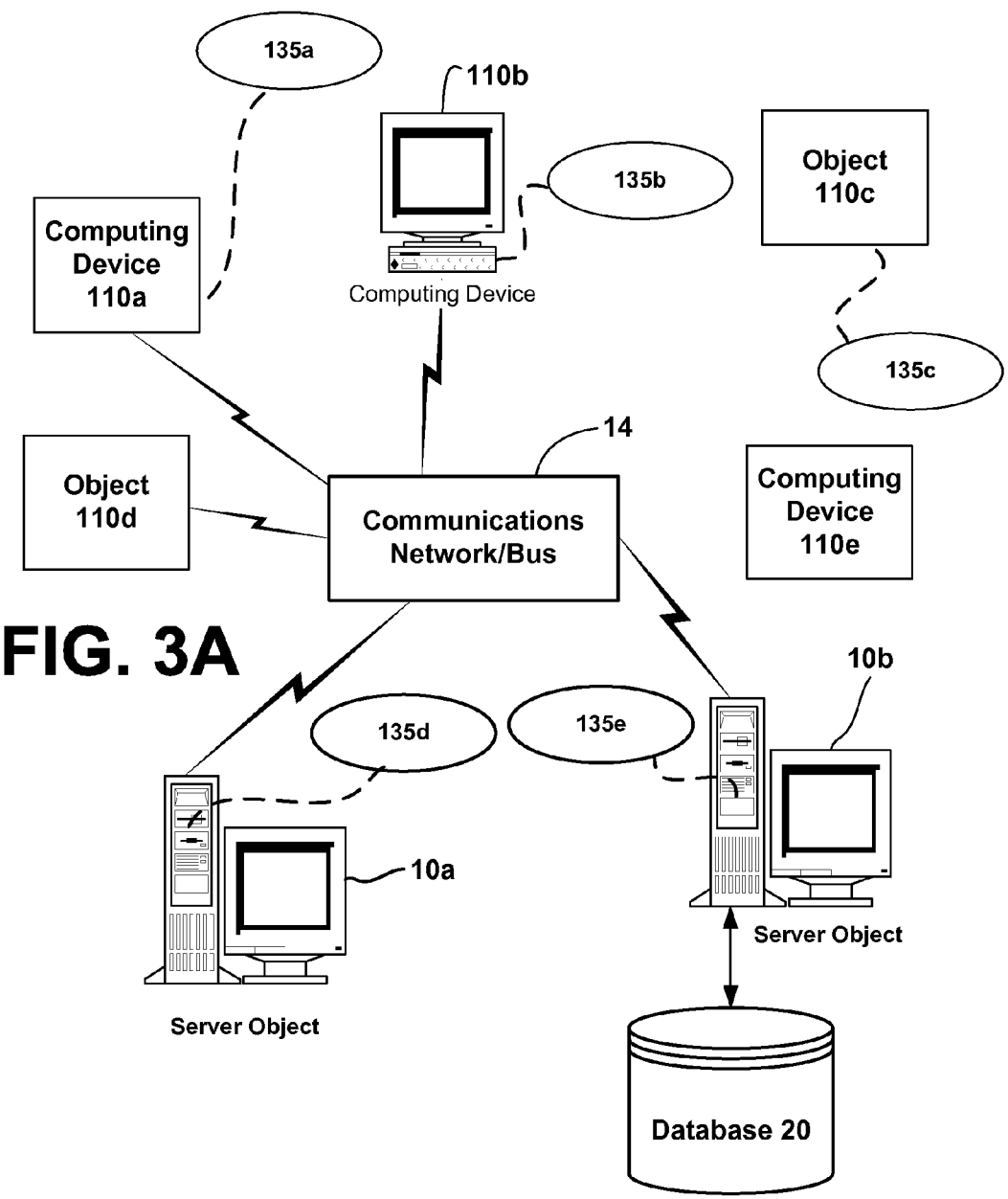
FIG. 3A is a block diagram representing an exemplary network environment having a variety of computing devices in which the present invention may be implemented.

A mechanism for providing controllable texture sampling is provided that enables 3-D accelerator hardware to greatly increase the level of realism in rendering and opens the way towards use of ray-tracing computations in 3-D hardware. Up until now, such methods have been restricted to software renderers working with a host processor, greatly slowing the graphics pipeline. In this regard, currently, 3-D graphics chips have a unit called a sampler that is used to extract the color out of a texture on a polygon during rendering. Since the positions of the pixels being rendered do not generally correspond exactly to the positions of the texels in the texture, there is some work involved. Texture sampling can function with various levels of sophistication using techniques described in the background, such as point sampling, bilinear filtering, MIP-mapping and anisotropic filtering, as well as other techniques. Such prior art techniques have fixed aspects to them, which do not apply well to all situations. Moreover, present anisotropic filtering techniques work to eliminate blurring effects whereas a developer may actually wish to create a blurring effect. Accordingly, the present invention exposes previously fixed parameters to the developer, so as to provide the developer with previously unprecedented intelligence with respect to the level of control over the texture sampling process. In various embodiments, the invention is shown to be useful for various texturing effects. Moreover, the invention may invariably implemented with software, hardware or both. For example, some implementation details may be implemented in a coprocessing chip, such as a GPU, whereas others may be exposed to a graphics developer via an API tool kit, an operating system, drivers, downloadable code, etc.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with a texture sampling process. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate a texture sampling process that may utilize the techniques of the present invention.

FIG. 3A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 3A. In accordance with an aspect of the invention, each object 10a, 10b, etc. or 110a, 110b, 110c, etc. may contain an application that might request texture sampling services.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network.

Texture sampling services in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since graphical object(s) and texture maps may in practice be physically located in one or more locations, the ability to distribute texture sampling services is of great utility in such a system.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to texture sampling of graphics object(s) and texture maps in accordance with the present invention.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 3A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 3A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process graphical object(s).

In a network environment in which the communications network/bus 14 is the Internet, for example, the servers 10a, 10b, etc. can be Web servers with which the clients 110a, 110b, 110 c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/ bus 14, and may have independent communications associated therewith. For example, in the case of a TV or VCR, there may or may not be a networked aspect to the control thereof. Each client computer 110a, 110b, 110 c, 110d, 110e, etc. and server computer 10a, 10b, etc. may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing graphics object(s) or intermediate graphics object(s) processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 3B:
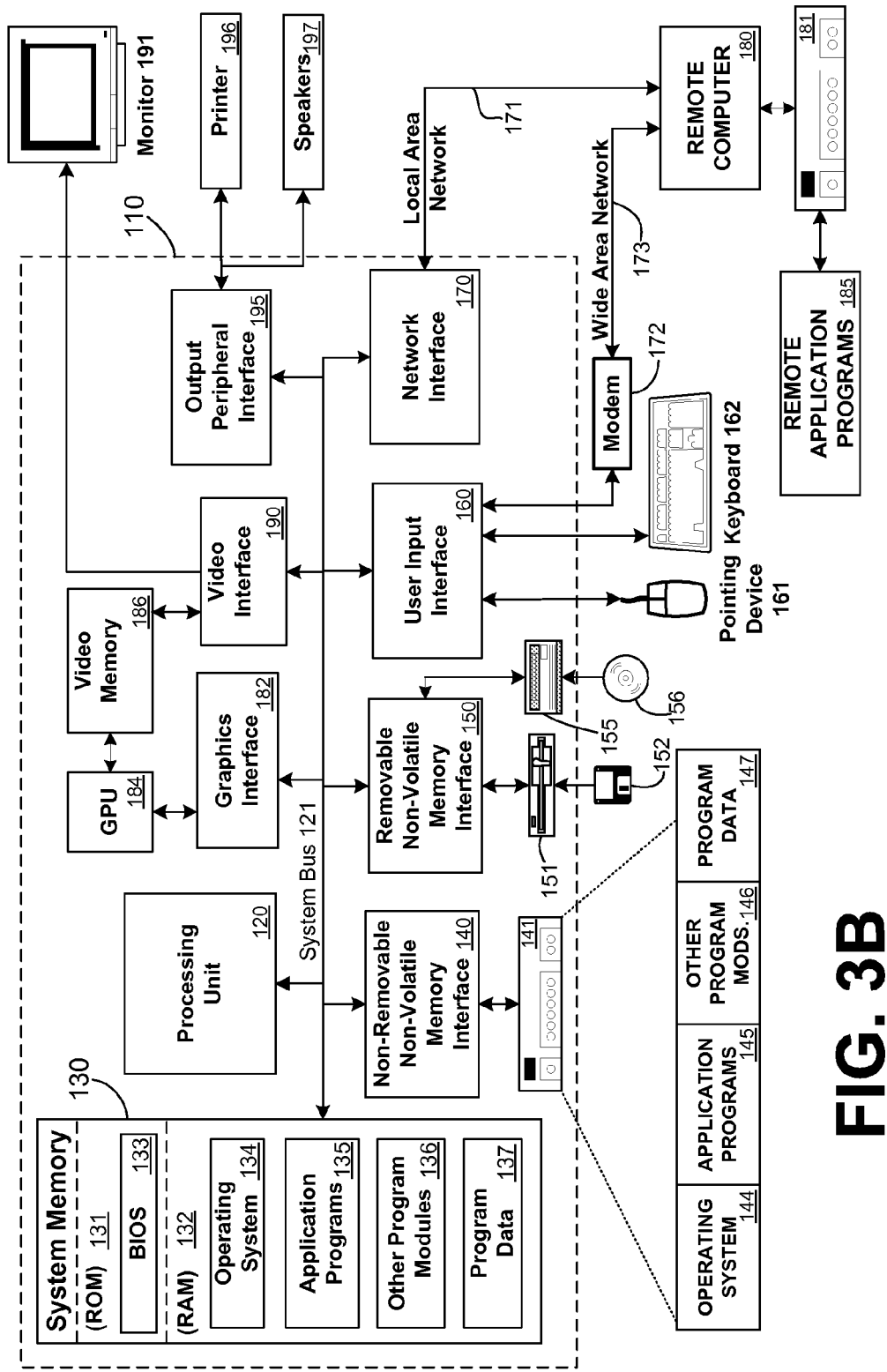
FIG. 3B is a block diagram representing an exemplary non-limiting computing device in which the present invention may be implemented.

FIG. 3B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the controllable texture sampling techniques of the invention.

Although not required, the invention can be implemented via an operating system, for use by a developer of services for a device or object, and/or included within application software that operates in connection with the controllable texture sampling of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 3B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 3B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3B illustrates operating system 134, application programs 135, other program modules 136, and program data 137.

The computer 110 may also include other removable/non-removable, volatile/nonvolatile computer storage media. By way of example only, FIG. 3B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3B provide storage of computer readable instructions, data structures, program modules and other data for the computer 110. In FIG. 3B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3B. The logical connections depicted in FIG. 3B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that controllable texture sampling services may be performed by, supported in or accessed via all of .NET's languages and services, and in other distributed computing frameworks as well.

Controllable Texture Sampling

As described in the background, there are a number of different techniques that can be applied to perform texture sampling with computer graphics depending upon the application involved. The problem, though, is that once selected, the technique is fixed without much flexibility such that if unique circumstances arise not suited to the texture sampling technique selected, or if the developer should desire certain artifacts, such as blurring, in the end result, little can be done. Accordingly, the invention applies intelligence to texture sampling algorithms so that a developer is afforded more freedom at the front end enabling more dynamic texture sampling at the backend. The techniques of the invention thus take advantage of the trend towards flex-function GPUs, exposing controllable texture sampling for developers to apply on the fly, and dynamic intelligence to handle different circumstances in different ways. Accordingly, in various embodiments, the invention provides, for any one or more of an operating system, driver code, an API, a tool kit and/or functionality in the graphics pipeline itself, including the GPU or other coprocessing device, a mechanism which provides controllable texture sampling capabilities.

Figure 4A:
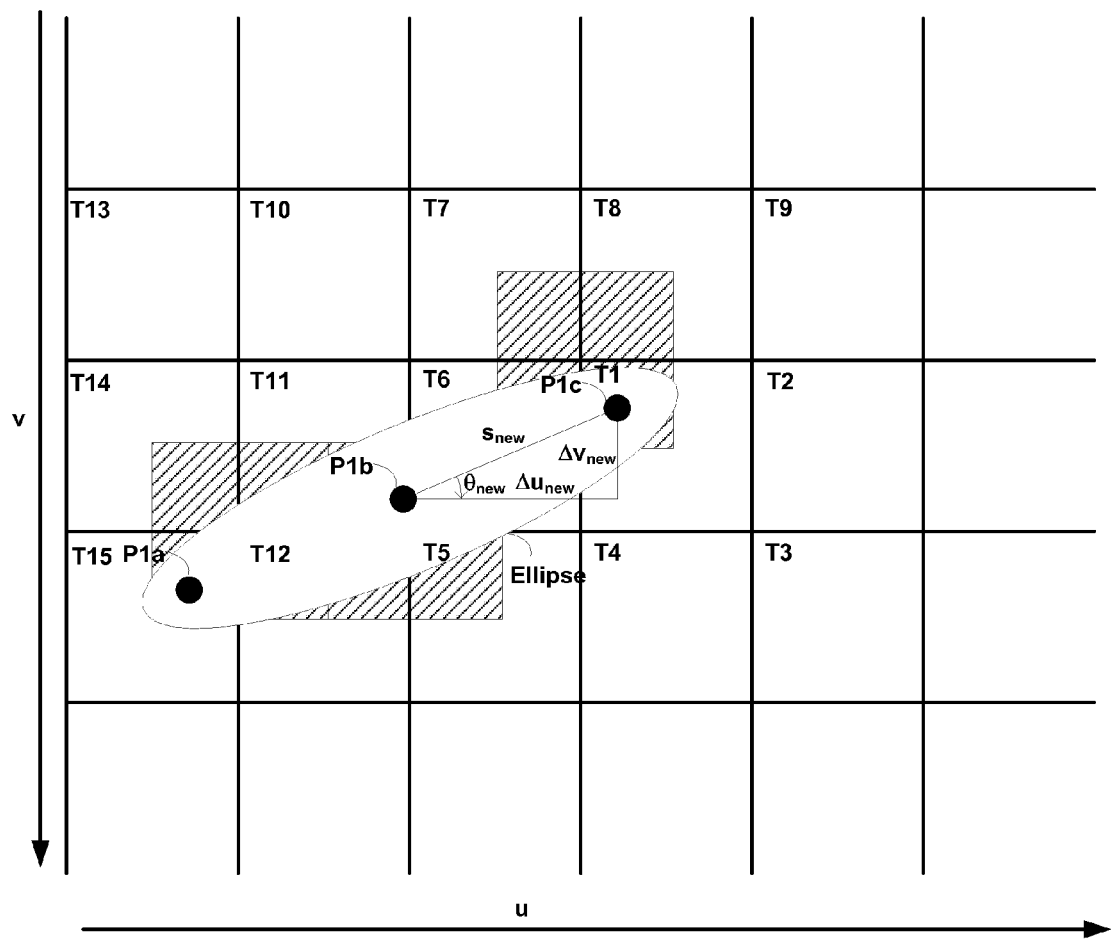
FIG. 4A illustrates an embodiment of the invention wherein controllable texture sampling is provided.
Figure 4B:
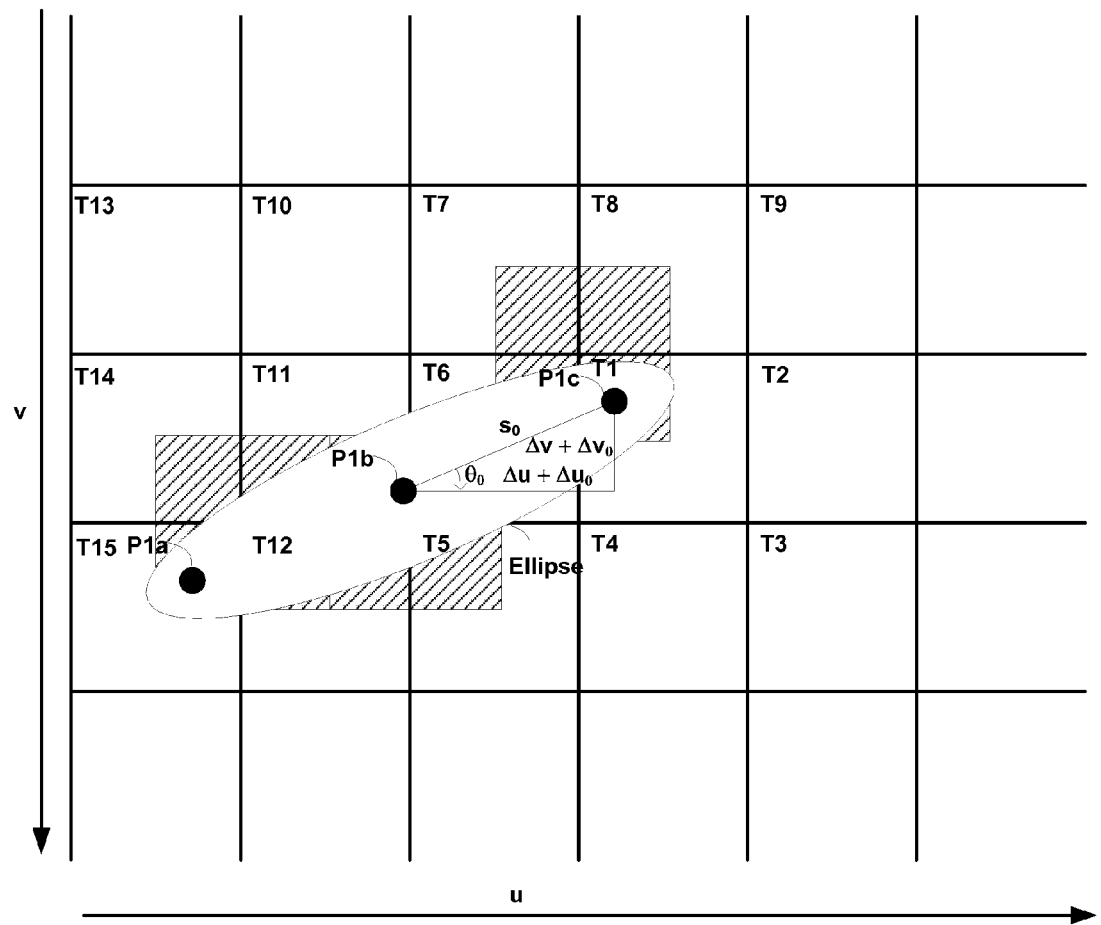
FIG. 4B illustrates a further embodiment of the invention wherein controllable texture sampling is provided.

The invention thus provides various techniques for controlling texture sampling processes via programmable sampling. As mentioned in the background, in one form of anisotropic filtering, bilinear filtering is performed multiple times along some angle. As illustrated in FIG. 4A, when the textured polygon is at an oblique angle to the plane of the screen, the footprint corresponding to a screen pixel mapped onto the texture becomes an elongated shape, such as an ellipse. Any currently known methods for computing the correct shape to use for this sampling footprint base their computations only on the relative geometry of the screen-pixel to polygon texels alignment, and none provide flexibility which enable a developer to predictably and intelligently control the size and orientation of the footprint directly. Thus, the invention provides various mechanisms for enabling either a "manual override" of the automatic computations already performed and/or a modification to the results they generate, enabling a new level of visual realism in real-time 3-D graphics.

With respect to a manual override, the invention may be utilized to replace the size and orientation of the footprint by replacing the $\Delta u$ and $\Delta v$ ordinarily utilized to compute the footprint with replacement values $\Delta u_{new}$ and $\Delta v_{new}$. This is illustrated in FIG. 4A, whereby $\Delta u_{new}$ and $\Delta v_{new}$ define a replacement orientation $\theta_{new}$ and define a replacement stepsize $s_{new}$. Thus, through specifying replacement $\Delta u_{new}$ and $\Delta v_{new}$ values via an API, operating system, tool kit, drivers, etc., the texture sampling process can be controlled. In this regard, today's flex function GPUs can receive tokens that represent the functionality to achieve this, by assigning and/or reassigning certain registers to achieve such processing. The GPUs can also be prefabricated to handle this processing. Replacement may in some circumstances be faster than presently used techniques since the chip no longer is involved in computing the parameters defined by the application during replacement.

With respect to a modification of the present footprint utilized in connection with the anisotropic techniques, the invention may be utilized to modify the size and orientation of the footprint by modifying the $\Delta u$ and $\Delta v$ ordinarily utilized to compute the footprint with offset values $\Delta u_0$ and $\Delta v_0$. This is illustrated in FIG. 4A, whereby $\Delta u+\Delta u_0$ and $\Delta v+\Delta v_0$ define a modified orientation $\theta_0$ and also define a modified stepsize $s_0$. Thus, through specifying offset $\Delta u_0$ and $\Delta v_0$ values via an API, operating system, tool kit, drivers, etc., the texture sampling process can be controlled. Similarly to the replacement, today's flex function GPUs can receive tokens that represent the functionality to achieve this, or prefabricated to achieve the same results. Modification, as described herein, contemplates any function of $\Delta u$ and $\Delta u_0$, or $\Delta v$ and $\Delta v_0$ not simply addition, i.e., multiplication, exponents, square roots, subtraction, or any mathematical function $F(\Delta u$ and $\Delta u_0)$ or $F(\Delta v$ and $\Delta v_0)$ is contemplated as may be appropriate to the filtering task at hand.

Both the modification and replacement capabilities may be provided at the same time, and are both optional, if the developer chooses to allow the hardware to behave as usual with respect to texture mapping. However, the invention provides the developer the option to supplement presently existing techniques by replacing and/or modifying the parameters that define the texture sampling footprint to achieve controllable texture sampling.

Also, as described in the background, exemplary equations for bilinear filtering known to those of ordinary skill in the graphics processing art include the following:

$$c_a = p_{i,j} \cdot \alpha + (p_{i,j+1}) \cdot (1-\alpha_a)$$

$$c_b = p_{i+1,j} \cdot \alpha + (p_{i+1,j+1}) \cdot (1-\alpha_a)$$

$$F = \text{lrp}(c_a, c_b) \cdot \alpha_b,$$

In further embodiment(s), the invention enables developers replacement or modification of the $\alpha_a$ and $\alpha_b$ used in connection with the bilinear filtering computation, to provide an additional layer of control over the texture sampling process.

The technique(s) provided by the invention are general and the range of applications for its use is virtually limitless. Thus, while numerous examples of its use are provided below and while numerous examples of effects in connection with which the invention can be used are given in the background, the invention is intended to apply to any texture sampling process for which it would be desirable to control aspects of the mapping.

Examples of use of the invention, and exemplary pseudocode therefor, are thus provided below.

Current methods for motion blur require multiple rendering passes, e.g., between four and eight, which directly results in slower performance, e.g., four to eight times slower performance. Using a filtering approach in accordance with the invention can provide similar results in just one pass with a much reduced impact on performance. In such a case, the invention would apply iterated (vertex-level) data to control the direction vector in which the blurring is to occur. As explained above, the direction vector can either be modified or replaced by modifying or replacing the defining parameters. A similar approach can be used to simulate and/or control reflection/Fresnel blur.

It is possible to generate anisotropic surface reflections and lighting effects for diffuse lighting, and for some approximations to specular lighting. True specular lighting comes from environment maps, which current techniques cannot sample anisotropically. The technique(s) of the invention enable anisotropic rendering of reflected environment maps. Such technique(s) are particularly suited for shiny, yet anisotropic surfaces, such as lightly brushed metal finishes on stainless steel fittings and can use either per-vertex and per-pixel specification of sampling direction by modifying or replacing the defining parameters of the sampling direction.

With respect to surface self-shadowing, many techniques exist that promote per-pixel lighting of surfaces. Most of these techniques can only perform diffuse illumination effects, which are by definition smooth, soft lighting effects.

The dominant visual impact of rough surfaces comes from the shadows that higher areas cast on lower areas, which provide crisp, high-contrast boundaries that clearly portray the roughness of the surface texture. Other methods for computing shadows in 3-D graphics can only cast shadows from one polygon onto another, and are not valid for computing shadows between texels on the same polygon. The invention thus applies per-pixel specification of sampling direction by modifying or replacing the defining parameters of the sampling direction.

Figure 5:
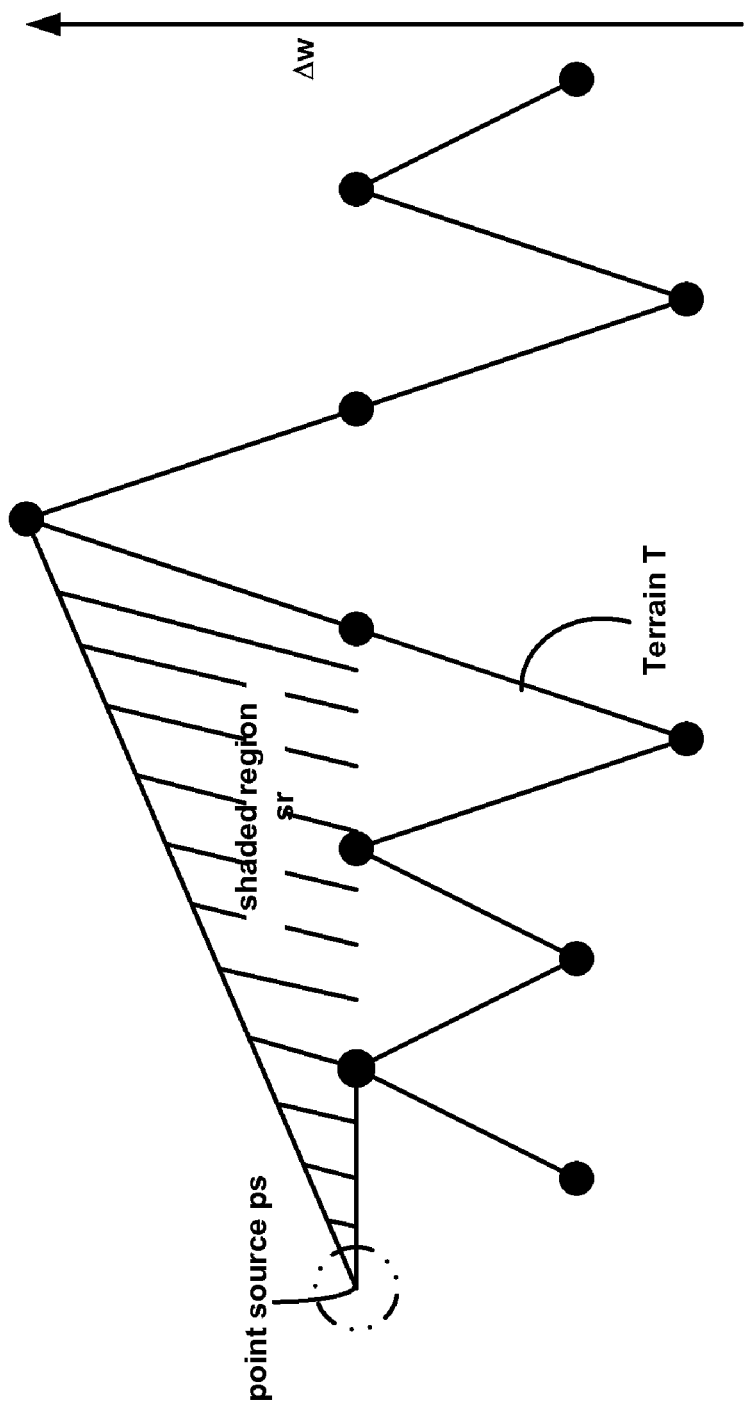
FIG. 5 illustrates a process in connection with which yet further embodiments of the invention may be applied.

FIG. 5 illustrates a basic principle behind shadowing, and illustrates further embodiments of the invention. In FIG. 5, an arbitrary terrain or surface T, to be shadowed, or lit, from a point source ps is illustrated, whereby the shaded region mathematically represents the areas of the surface which are exposed to rays from the point source ps. In this regard, the terrain T is defined by a plurality of points, which, in addition to having u and v values, also have a w value which corresponds to the height of the point of the terrain T. Thus, sampling direction for shadowing or lighting in 3-D typically involves setting a 3-D sampling direction vector having an orientation and stepsize defined by $\Delta u$, $\Delta v$ and $\Delta w$ values. In this regard, the invention enables the replacement or modification of $\Delta u$, $\Delta v$ and $\Delta w$ values extending the techniques applied to the $\Delta u$ and $\Delta v$ values, described above, to the $\Delta w$ value.

With respect to ray-cast volumetric sampling, current methods for volumetric rendering require slicing the volume up into polygons relatively orthogonal to the eye-direction. This produces banding artifacts along the edges and corners of such volumes. The technique(s) of the invention enable controllable avoidance of these artifacts and improve performance as well. The invention thus enables the specification or modification of a 3-D vector, which determines the sampling direction, which is then iterated linearly from the vertices. Sampling could then be done by a series of multi-cell, e.g., 8-cell, trilinear samples, or by bilinear samples.

With respect to self-shadowed volumetric rendering, when using this technique in combination with conventional slice or splat-style volumetric rendering, either self-shadowing or self-illuminating effects can be simulated within the rendered volume. The invention thus enables a per-vertex specification or modification of a 3-D sampling direction vector.

With respect to self-shadowed volumetric ray-casting, a nested loop level is added, where at each sample along the ray, a separate set of samples is cast along the direction to the light source to provide true volumetric ray-casting rendering with self-shadowing. This technique is a straightforward extension of the techniques discussed so far, but implicates more significant changes to the sampling hardware.

With respect to programmable texture sampling and sampling shaders, the key technique realized by the invention is to allow the application, or developer, to specify direction and spacing of anisotropic filter kernel samples.

Programmed values used in current bi/trilinear sampling include: u-width and v-width of a four point kernel. Additional values for programmable anisotropic sampling in accordance with the invention include the du spacing of samples in u, and the dv spacing of samples in v. In this regard, the invention allows for specification or modification of these parameters per pixel in addition to per-vertex, followed by iteration. For example, such techniques would be sufficient for anisotropically blurred environment maps.

Non-Limiting Exemplary Pseudocode

Exemplary pseudocode for a basic anisotropic shader is as follows:

for each pixel

```
{
    ComputeBaseUV( &u, &v )
    ComputeDuDv (based on std area eqn)
    sum = 0.0;
    for each sample
    {
        u = u + du;
        v = v + dv;
        sum += GetBilinearSample( u, v )
    }
    sum = sum/nsamples (1,2,4,8)
}
```

Exemplary pseudocode for a shader for motion blur, e.g., for an anisotropic blur shader for simulating brushed metal with environment maps, that operates on 2-D per-vertex data is as follows:

for each pixel

```
{
    ComputeBaseUV( &u, &v )
    ReadDuDv from texture or iterators if per poly
    sum = 0.0;
    for numsamples (preferably pow2)
    {
        u = u + du;
        v = v + dv;
        sum += GetBilinearSample( u, v );
    }
    sum = sum/nsamples (1,2,4,8,16);
    return sum;
}
```

Exemplary pseudocode for a sharp shadow surface shader, e.g., for a local surface self-shadowing shader, which yields sharp shadow edges, but allows early-out of sampling when it is determined that the position is in shadow, is as follows:

```
du, dv, dw                    // steps in direction of light source
                              // (iterated from vertices)
for each pixel
{
    ComputeBaseUV( &u, &v )
    w = SampleH( u, v );      // init ray at this pixel
    sum = 0.0;
    for i=0; i<numsamples (no pow2 reqt)
    {
        u = u + du;           // iterate towards light
        v = v + dv;
        w = w + dw;
        h = sampleH( u, v );  // get height
        if ( h > w )           // if height above ray
            return 0.5;       // then pixel is in shadow
    }
    return 1.0;               // else it's fully lit
}
```

Exemplary pseudocode for a fuzzy shadows surface shader, which computes a fractional shadow value by distributing the shadow to closest occluder(s), is as follows:

```
du, dv, dw                         // steps in direction of light source
                                   // (iterated from vertices)
for each pixel
{
    ComputeBaseUV( &u, &v )
    w = SampleH( u, v );           // init ray at this pixel
    sum = 0.0;
    for numSamples( no need for pow2 )
    {
        u = u + du;                // iterate towards light
        v = v + dv;
        w = w + dw;
        h = sampleH( u, v );       // get height
        del = h - w;               // height above ray
        if ( del > max ) max = del; // find highest value
    }
    mapMaxtoShadow( )
}
```

Further examples of the use of the invention include providing a programmable volumetric ray-casting shader, which accumulates and integrates trilinear sample values. Such as a shader can behave differently based on how hard the data is in the pipelined environment. In this regard, the invention can be utilized in concert with the z-buffer to integrate opaque objects. In such a case, one z-buffer read may be performed, and the z-buffer may be compared per sample. Also, such a technique could assume that rays are always away from eye, such that integration can terminate in accordance with the result of the depth compare operation.

Other examples of the use of the invention include providing a programmable self-shadowing volumetric fog/fur shader, which utilizes a current splat-type rendering method for volume data, but uses the technique(s) described above to compute shadow rays.

There are multiple ways of implementing the present invention. One way is to provide an implementation whereby the coprocessor(s), e.g., GPU(s), are pre-fabricated to perform the functionality of the invention, and receive commands suited to the controllable texture sampling described herein. Another implementation of the invention includes manually or automatically programming the coprocessor(s) to achieve the functionality of the invention, whereby an appropriate API, tool kit, driver code, operating system, standalone or downloadable software object, etc. enables the use the invention as between the application and the coprocessor. Another implementation includes altering the parameters fed to the coprocessor(s) on the by the application to make the modification/replacement of the footprint parameters of the texture sampling process transparent to the coprocessor(s). Thus, the invention contemplates implementing the programmable texture sampling described herein wholly in hardware, partly in hardware and partly in software, as well as a software implementation.

In an exemplary implementation of the invention, an API component is provided which enables the specification of parameter(s) in the sampling statement that identifies a direction vector for sampling to occur. All of the variations described above with respect to multi-dimensional sampling vectors are also contemplated. For instance, the third component used for elevation slope can be used for casting shadows, volumetric rendering, etc. An example of such an API component for operating upon hardware registers is as follows in pseudocode format:

```
LD# r0, t0, v0
sample texture set at stage #
place result in r0
sample at texcoord t0
with footprint axis v0
and sampling count/blending mode defined in declaration of stage # as in:
    stg #  wrapmode=off,
           tilemode = wrap,
           filtermode=programmable,
               samplecount=16
               width=1
               filterop = replace (app-specified values)
```

An exemplary hardware portion, which makes the direction vector/stride for anisotropic shading controllable by the above API-specified means, includes the following functionality: (A) Defaults, (B) Replace, (C) Add and (D) Modulation.

In this regard, Defaults define conventional non-application controlled sampling, which compute stride and direction for sampling based on a standard anisotropic filtering algorithm.

The Replace function replaces the Defaults with application specified values. The Add function adds the application specified values to the chip computed values to determine the final sampling direction. The Modulate function multiplies the application specified direction vector by the chip computed one to determine the final sampling direction.

In one embodiment of the invention, hardware chips make use of existing dependent-read hardware techniques to take individual samples in order to implement the various techniques of the invention. Such an embodiment allows an application to control the position of every sample in the kernel, not just that of each set of two by two bilinear footprints, and thus is more general than some of the techniques described above.

Further uses of the invention include the use of the derivatives of Nelson Max's horizon mapping approach to achieve self shadowed textures by controlling the parameters utilized incident thereto.

The invention in its various relevant embodiments also supports (1) detection of, (2) "early-out" or (3) a return of null(s) when the cast ray intersects the current z-buffer, or when saturation occurs.

In other embodiments of the invention, programmable sampling shaders are provided that allow algorithmic control of sampling operations, as described in various detail above. Further more, certain second order effects are achieved, such as the ability to vary the spacing of these increments, or the size of the kernel at each step so blurring, distributed lights, etc. can be modeled.

As mentioned above, while exemplary embodiments of the present invention have been described in connection with various computing devices and network architectures, the underlying concepts may be applied to any computing device or system in which it is desirable to perform texture sampling. Thus, the techniques for providing improved signal processing in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting.

One of ordinary skill in the art will appreciate that there are numerous ways of providing object code that achieves the same, similar or equivalent controllable texture sampling achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for providing controllable texture sampling, comprising:

specifying via a 3-D graphics application programming interface (API) of a host computing system at least one parameter of a sampling footprint utilized in connection with controllable texture sampling of a texture map by a graphics subsystem of the host computing system having a graphics processing unit, wherein:

said specifying of at least one parameter includes specifying at least one parameter of a sampling footprint that applies self-shadowed volumetric rendering in combination with conventional slice or splat-style volumetric rendering and said specifying further includes applying a per-vertex specification of a sampling direction of the sampling footprint;

said specifying includes at least one of:

modifying at least one standard parameter by specifying at least one offset value for said at least one standard parameter; and replacing at least one standard parameter with at least one replacement parameter;

transmitting said at least one parameter via the 3-D graphics API to the graphics processing unit to perform said controllable texture sampling in accordance with said at least one parameter; and texture sampling said texture map in accordance with said specified at least one parameter of said sampling footprint.

2. A method according to claim 1, wherein said modifying includes at least one of adding the offset value and the standard parameter, multiplying the offset value and the standard parameter, applying one of the offset value and the standard parameter as an exponent, subtracting the offset value and the standard parameter, and performing a predefined mathematical function based on the standard parameter and the offset value.

3. A method according to claim 1, wherein said sampling footprint is a sampling footprint from at least one of a point sampling process, a bilinear filtering process, a MIP-mapping process, an anisotropic filtering process and an antialiasing process.

4. A method according to claim 1, wherein said specifying includes specifying said at least one parameter at least one of per vertex and per pixel in connection with said texture sampling.

5. A method according to claim 4, further including iteratively applying said texture sampling.

6. A method according to claim 4, wherein said specifying includes at least one of specifying du spacing of samples in a u direction and specifying dv spacing of samples in a v direction.

7. A method according to claim 4, wherein said specifying includes specifying at least one of a $\Delta u$ value, a $\Delta v$ value and a $\Delta w$ value.

8. A method according to claim 1, wherein said specifying includes specifying at least one of a stepsize and an orientation of the sampling footprint.

9. A method according to claim 1, wherein said specifying includes specifying one of an $\alpha a$ value and an $\alpha b$ value for use in connection with bilinear filtering computation.

10. A method according to claim 1, wherein said sampling footprint is an anisotropic filtering sampling footprint.

11. A method according to claim 10, wherein said at least one parameter includes at least one of a direction and a spacing of anisotropic filter kernel samples.

12. A method according to claim 1, wherein said texture sampling of said texture map in accordance with said at least one parameter alters at least one visual effect of pixel space resulting from said texture sampling, and said at least one visual effect includes at least one of: a bluffing effect, a blockiness effect, a texture swimming effect, a pixel-popping effect, a temporal aliasing effect, a texture shimmering effect, a texture crawling effect and a streaking effect.

13. A method according to claim 1, wherein said texture sampling of said texture map in accordance with said at least one parameter textures a triangle surface to achieve at least one of a lighting effect, a bump mapping effect, a blurring effect, a reflection blurring effect, a Fresnel blurring effect, a marbling effect, a moving water effect, a linear fogging effect, an exponential fogging effect, a range-based fogging effect, a transparency effect, a translucency effect, a curved surface effect, a sharp shadowing effect, a fuzzy shadowing effect and a volumetric texturing effect.

14. A method according to claim 1, wherein said specifying of at least one parameter includes specifying at least one parameter of a sampling footprint that applies motion blur and said specifying further includes applying iterated vertex-level data to control a direction vector of the sampling footprint.

15. A method according to claim 1, wherein said specifying of at least one parameter includes specifying at least one parameter of a sampling footprint that applies at least one of anisotropic surface reflection, diffuse lighting and an approximation to specular lighting and said specifying further includes applying one of per-vertex and per-pixel specification of sampling direction of the sampling footprint.

16. A method according to claim 1, wherein said specifying of at least one parameter includes specifying at least one parameter of a sampling footprint that applies surface self-shadowing and said specifying further includes applying per-pixel specification of sampling direction of the sampling footprint.

17. A method according to claim 1, wherein said specifying of at least one parameter includes specifying at least one parameter of a sampling footprint that applies surface self-shadowing and said specifying further includes applying per-vertex specification of sampling direction of the sampling footprint.

18. A method according to claim 17, wherein said specifying further includes specifying control parameters for derivative calculations of Nelson Max's horizon mapping.

19. A method according to claim 1, wherein said specifying includes specifying a direction vector of the sampling footprint via an API component.

20. A computing device comprising means for performing the method of claim 1.

21. A computer readable storage medium for providing controllable texture sampling having stored thereon at least one computer-executable module comprising computer executable instructions for performing a method, the method comprising:
specifying via a 3-D graphics application programming interface (API) of a host computing system at least one parameter of a sampling footprint utilized in connection with controllable texture sampling of a texture map by a graphics subsystem of the host computing system having a programmable graphics processing unit, wherein:
said specifying of at least one parameter includes specifying at least one parameter of a sampling footprint that applies self-shadowed volumetric rendering in combination with conventional slice or splat-style volumetric rendering and said specifying further includes applying a per-vertex specification of sampling direction of the sampling footprint, wherein said specifying includes at least one of:
modifying at least one standard parameter by specifying at least one offset value for said at least one standard parameter; and
replacing at least one standard parameter with at least one replacement parameter;
transmitting said at least one parameter via the 3-D graphics API to the programmable graphics processing unit to perform said controllable texture sampling in accordance with said at least one parameter; and
initiating texture sampling whereby said programmable graphics processing unit performs texture sampling of said texture map in accordance with said specified at least one parameter parameters of said sampling footprint received via said 3-D graphics API.

22. A computer readable storage medium according to claim 21, wherein said modifying includes at least one of adding the offset value and the standard parameter, multiplying the offset value and the standard parameter, applying one of the offset value and the standard parameter as an exponent, subtracting the offset value and the standard parameter, and performing a predefined mathematical function based on the standard parameter and the offset value.

23. A computer readable storage medium according to claim 21, wherein said sampling footprint is a sampling footprint from at least one of a point sampling process, a bilinear filtering process, a MIP-mapping process, an anisotropic filtering process and an antialiasing process.

24. A computer readable storage medium according to claim 21, wherein said specifying includes specifying said at least one parameter at least one of per vertex and per pixel in connection with said texture sampling.

25. A computer readable storage medium according to claim 24, further including iteratively applying said texture sampling.

26. A computer readable storage medium according to claim 24, wherein said specifying includes at least one of specifying du spacing of samples in a u direction and specifying dv spacing of samples in a v direction.

27. A computer readable storage medium according to claim 24, wherein said specifying includes specifying at least one of a $\Delta u$ value, a $\Delta v$ value and a $\Delta w$ value.

28. A computer readable storage medium according to claim 21, wherein said specifying includes specifying at least one of a stepsize and an orientation of the sampling footprint.

29. A computer readable storage medium according to claim 21, wherein said specifying includes specifying one of an $\alpha a$ value and an $\alpha b$ value for use in connection with bilinear filtering computation.

30. A computer readable storage medium according to claim 21, wherein said sampling footprint is an anisotropic filtering sampling footprint.

31. A computer readable storage medium according to claim 30, wherein said at least one parameter includes at least one of a direction and a spacing of anisotropic filter kernel samples.

32. A computer readable storage medium according to claim 21, wherein texture sampling initiated by said initiating texture sampling of said texture map in accordance with said at least one parameter alters at least one visual effect of pixel space resulting from said texture sampling, and said at least one visual effect includes at least one of: a bluffing effect, a blockiness effect, a texture swimming effect, a pixel-popping effect, a temporal aliasing effect, a texture shimmering effect, a texture crawling effect and a streaking effect.

33. A computer readable storage medium according to claim 21, wherein said texture sampling initiated by said initiating texture sampling of said texture map in accordance with said at least one parameter textures a triangle surface to achieve at least one of a lighting effect, a bump mapping effect, a blurring effect, a reflection bluffing effect, a Fresnel bluffing effect, a marbling effect, a moving water effect, a linear fogging effect, an exponential fogging effect, a range-based fogging effect, a transparency effect, a translucency effect, a curved surface effect, a sharp shadowing effect, a fuzzy shadowing effect and a volumetric texturing effect.

34. A computer readable storage medium according to claim 21, wherein said specifying of at least one parameter includes specifying at least one parameter of a sampling footprint that applies motion blur and said specifying further includes applying iterated vertex-level data to control a direction vector of the sampling footprint.

35. A computer readable storage medium according to claim 21, wherein said specifying of at least one parameter includes specifying at least one parameter of a sampling footprint that applies at least one of anisotropic surface reflection, diffuse lighting and an approximation to specular lighting and said specifying further includes applying one of per-vertex and per-pixel specification of sampling direction of the sampling footprint.

36. A computer readable storage medium according to claim 21, wherein said specifying of at least one parameter includes specifying at least one parameter of a sampling footprint that applies surface self-shadowing and said specifying further includes applying per-pixel specification of sampling direction of the sampling footprint.

37. A computer readable storage medium according to claim 21, wherein said specifying of at least one parameter includes specifying at least one parameter of a sampling footprint that applies surface self-shadowing and said specifying further includes applying per-vertex specification of sampling direction of the sampling footprint.

38. A computer readable storage medium according to claim 37, wherein said specifying further includes specifying control parameters for derivative calculations of Nelson Max's horizon mapping.

39. A computer readable storage medium according to claim 21, wherein said specifying includes specifying a direction vector of the sampling footprint via an application programming interface (API) component.

40. A computer readable storage medium according to claim 21, wherein said modules are included in at least one of an application programming interface (API), driver code, an operating system and an application.

41. A coprocessing device of a graphics subsystem of a host computing system for use in connection with controllable texture sampling instructions from the host computing system, comprising:
an input component operable to receive from a 3-D graphics application programming interface (API) of the host computing system a specification of at least one parameter of a sampling footprint utilized in connection with controllable texture sampling of a texture map, wherein:
said input component that receives instructions for specifying of at least one parameter includes a first input component that receives instructions for specifying at least one parameter of a sampling footprint that applies self-shadowed volumetric rendering in combination with conventional slice or splat-style volumetric rendering and said input component that receives instructions for specifying further includes a second input component that receives instructions for applying per-vertex specification of sampling direction of the sampling footprint, wherein said input component includes at least one of:
a first input component that receives instructions for modifying at least one standard parameter by receiving a specification of at least one offset value for said at least one standard parameter; and
a second input component that receives instructions for replacing at least one standard parameter with at least one replacement parameter; and
a texture sampling component operable to perform controllable texture sampling on said texture map in accordance with said at least one parameter of said sampling footprint received from the 3-D graphics API of the host computing system.

42. A coprocessing device according to claim 41, wherein said first input component that receives instructions for modifying includes at least one of a third input component that receives instructions for adding the offset value and the standard parameter, a fourth input component that receives instructions for multiplying the offset value and the standard parameter, a fifth input component that receives instructions for applying one of the offset value and the standard parameter as an exponent, a sixth input component that receives instructions for subtracting the offset value and the standard parameter, and a seventh input component that receives instructions for performing a predefined mathematical function based on the standard parameter and the offset value.

43. A coprocessing device according to claim 41, wherein said sampling footprint is a sampling footprint from at least one of a point sampling process, a bilinear filtering process, a MIP-mapping process, an anisotropic filtering process and an antialiasing process.

44. A coprocessing device according to claim 41, wherein said input component that receives instructions for specifying includes a component that receives instructions for specifying said at least one parameter at least one of per vertex and per pixel in connection with said texture sampling component.

45. A coprocessing device according to claim 44, further including iteratively applying said texture sampling of the texture sampling component.

46. A coprocessing device according to claim 44, wherein said input component that receives instructions for specifying includes at least one of a first input component that receives instructions for specifying du spacing of samples in a u direction and a second input component that receives instructions for specifying dv spacing of samples in a v direction.

47. A coprocessing device according to claim 44, wherein said input component that receives instructions for specifying includes a component that receives instructions for specifying at least one of a $\Delta u$ value, a $\Delta v$ value and a $\Delta w$ value.

48. A coprocessing device according to claim 41, wherein said input component that receives instructions for specifying includes a component that receives instructions for specifying at least one of a stepsize and an orientation of the sampling footprint.

49. A coprocessing device according to claim 41, wherein said input component that receives instructions for specifying includes a component that receives instructions for specifying one of an $\alpha a$ value and an $\alpha b$ value for use in connection with bilinear filtering computation.

50. A coprocessing device according to claim 41, wherein said sampling footprint is an anisotropic filtering sampling footprint.

51. A coprocessing device according to claim 50, wherein said at least one parameter includes at least one of a direction and a spacing of anisotropic filter kernel samples.

52. A coprocessing device according to claim 41, wherein said texture sampling of said texture map by the texture sampling component in accordance with said at least one parameter alters at least one visual effect of pixel space resulting from said texture sampling, and said at least one visual effect includes at least one of: a bluffing effect, a blockiness effect, a texture swimming effect, a pixel-popping effect, a temporal aliasing effect, a texture shimmering effect, a texture crawling effect and a streaking effect.

53. A coprocessing device according to claim 41, wherein said texture sampling of said texture map by the texture sampling component in accordance with said at least one parameter textures a triangle surface to achieve at least one of a lighting effect, a bump mapping effect, a blurring effect, a reflection blurring effect, a Fresnel blurring effect, a marbling effect, a moving water effect, a linear fogging effect, an exponential fogging effect, a range-based fogging effect, a transparency effect, a translucency effect, a curved surface effect, a sharp shadowing effect, a fuzzy shadowing effect and a volumetric texturing effect.

54. A coprocessing device according to claim 41, wherein said input component that receives instructions for specifying of at least one parameter includes a first input component that receives instructions for specifying at least one parameter of a sampling footprint that applies motion blur and said input component further includes a second component that receives instructions for applying iterated vertex-level data to control a direction vector of the sampling footprint.

55. A coprocessing device according to claim 41, wherein said input component that receives instructions for specifying of at least one parameter includes a first input component that receives instructions for specifying at least one parameter of a sampling footprint that applies at least one of anisotropic surface reflection, diffuse lighting and an approximation to specular lighting and said input component that receives instructions for specifying further includes a second component that receives instructions for applying one of per-vertex and per-pixel specification of sampling direction of the sampling footprint.

56. A coprocessing device according to claim 41, wherein said input component that receives instructions for specifying at least one parameter includes a first input component that receives instructions for specifying at least one parameter of a sampling footprint that applies surface self shadowing and said input component that receives instructions for specifying further includes a second input component that receives instructions for applying per-pixel specification of sampling direction of the sampling footprint.

57. A coprocessing device according to claim 41, wherein said input component that receives instructions for specifying of at least one parameter includes a first input component that receives instructions for specifying at least one parameter of a sampling footprint that applies surface self-shadowing and said input component that receives instructions for specifying further includes a second input component that receives instructions for applying per-vertex specification of sampling direction of the sampling footprint.

58. A coprocessing device according to claim 57, wherein said input component that receives instructions for specifying further includes a component that receives instructions for specifying control parameters for derivative calculations of Nelson Max's horizon mapping.

59. A coprocessing device according to claim 41, wherein said input component that receives instructions for specifying includes a component that receives instructions for specifying a direction vector of the sampling footprint from at least one of an application programming interface (API), driver code, an operating system and an application.

60. A coprocessing device according to claim 41, wherein said coprocessing device includes at least one graphics processing unit (GPU).

* * * * *